UNITED STATES PATENT OFFICE.

GEORGE O. BASSETT, OF BLOOMFIELD, NEW JERSEY, ASSIGNOR TO WESTERN ELECTRIC COMPANY, INCORPORATED, OF NEW YORK, N. Y., A CORPORATION OF NEW YORK.

INSULATING AND SEALING COMPOSITION.

1,345,057.      Specification of Letters Patent.     Patented June 29, 1920.

No Drawing.     Application filed June 8, 1917. Serial No. 173,560.

*To all whom it may concern:*

Be it known that I, GEORGE O. BASSETT, a citizen of the United States, residing at Bloomfield, in the county of Essex and State of New Jersey, have invented certain new and useful Improvements in Insulating and Sealing Compositions, of which the following is a full, clear, concise, and exact description.

This invention relates to insulating and sealing compositions and its object is to provide a sealing composition which has a high melting point and also possesses good insulation properties.

This invention utilizes the desirable property of hardened resin of having a high melting point and gives the substance the desired degree of plasticity, adhesiveness and viscosity by adding thereto in proper amounts a suitable wax, oil and an asphaltic substance.

It is well known in the art that a resin like colophony, fossil resin, copal, dammar resin and the like, may have its melting point considerably increased by subjecting the substance to a prolonged distillation. Another method of increasing its melting point is to alternately melt and solidify the substance a number of times. Still another method is to produce a more or less oxidation of the substance. But the preferable and most convenient method is to add to the resin a metallic oxid, or a mixture of metallic oxids, such as iron, zinc, manganese, calcium, or other oxids and to melt the mixture until it is intimately mixed. The amount of metallic oxid to be added will depend on the character of the resin, being chiefly controlled by the amount of acid present, but in general, it may be said that the average resin will require from five per cent. to fifteen per cent. of oxid.

A hardened resin by itself does not possess all the qualities necessary for a sealing or insulating compound, as it is too brittle to be of much use. In accordance with this invention it has been found, however, that the addition of a bituminous substance, such as the asphaltic material, known as "sarco", gives it the desired plasticity. Sarco is a well-known insulating and water-proofing compound which contains approximately 98% bituminous material, the remaining amount comprising sulfur, carbon, and mineral ash. An easy flowing mixture when melted may be secured by the addition of some wax, as paraffin, beeswax, or the like. Adhesiveness, if desired, may be obtained by adding to the mixture a small amount of a suitable oil, preferably such an oil as resin oil, china wood oil, linseed oil, and the like. Such a mixture is very suitable for a filling or sealing compound, since, while it has a high melting point, it still melts below the melting point of solder, and may be readily poured as an easy flowing liquid on or around a soldered connection without any danger of melting the same. It has also been found that its insulation properties are excellent.

In accordance with the principles set forth above for obtaining suitable physical properties, it is preferable to use a mixture composed substantially in the following proportions:

Hardened resin _____ 30 parts
Bituminous material ____ 45 parts
Wax _____ 22 parts
Oil _____ 3 parts These proportions need not be strictly adhered to, as the percentage of each ingredient depends largely on the character of the materials with which it is mixed. The amount of bituminous material to add will depend chiefly upon its character, and thus for some grades of asphaltum, it is necessary to use as much as 50 parts of asphaltum, while for other grades which have been subjected to prolonged heating, it may be necessary to add only 35 to 40 parts. In accordance with the variations in amounts of asphaltic material used, the amounts of hardened resin used may vary from 20 to 35 parts of the compound. The amount of wax and oil employed will depend chiefly upon what degree of viscosity and adhesiveness of the melted mixture is desired. The amounts of wax and oil used may also vary from 15 to 30 parts of the compound. It is evident that for those uses of this filling composition in which a particular degree of viscosity and adhesiveness is non-essential, the wax and the oil may be omitted from the compound.

What is claimed is:

1. An insulating and filling composition comprising by weight: about 20 to 35 parts of hardened resin, 40 to 50 parts of asphaltic material, and 15 to 30 parts of a mixture of a wax and a vegetable oil.

2. An insulating and filling composition composed, substantially by weight of:

| | |
|---|---|
| Hardened resin | 30 parts |
| Asphaltic material | 45 parts |
| Wax | 22 parts |
| Vegetable oil | 3 parts |

3. An insulating and filling composition composed substantially by weight of:

| | |
|---|---|
| Hardened colophony | 30 parts |
| Asphaltic material | 45 parts |
| Paraffin | 22 parts |
| Resin oil | 3 parts |

4. A plastic composition comprising asphaltic material and 20 to 35 parts of hardened resin.

5. A plastic composition comprising asphaltic material, a wax, a vegetable oil, and 20 to 35 parts of hardened resin.

6. A plastic composition of matter comprising 20 to 35 parts of hardened resin and 35 to 50 parts of asphaltic material.

7. A plastic composition of matter comprising 20 to 35 parts of hardened resin and 35 to 50 parts of asphaltic material, and 15 to 30 parts of a mixture of a wax and a vegetable oil.

In witness whereof I hereunto subscribe my name this 4 day of June, A. D. 1917.

GEORGE O. BASSETT